United States Patent

McKinney et al.

[11] Patent Number: 5,882,109
[45] Date of Patent: *Mar. 16, 1999

[54] ANTI-GLARE ALL-ROUND NAVIGATION LIGHT

[75] Inventors: Elzie McKinney, Grand Rapids; Bruce L. Reniger, Alto, both of Mich.

[73] Assignee: Attwood Corporation, Lowell, Mich.

[*] Notice: This patent issued on a continued prosecution application filed under 37 CFR 1.53(d), and is subject to the twenty year patent term provisions of 35 U.S.C. 154(a)(2).

[21] Appl. No.: 769,961

[22] Filed: Dec. 19, 1996

[51] Int. Cl.$^6$ .................................................... B60Q 1/00
[52] U.S. Cl. ........................ 362/477; 362/311; 362/360; 362/421; 362/427; 362/431; 340/984
[58] Field of Search .............................. 362/61, 80, 153.1, 362/186, 285, 311, 326, 335, 351, 360, 421, 427, 431, 477; 340/981–985; 114/66, 343

[56] References Cited

U.S. PATENT DOCUMENTS

| D. 184,988 | 4/1959 | DeHart | D26/36 |
|---|---|---|---|
| D. 192,532 | 4/1962 | Hansen et al. | D26/36 |
| D. 222,289 | 10/1971 | Banter et al. | D26/36 |
| D. 231,795 | 6/1974 | Brudy | D26/28 |
| D. 288,133 | 2/1987 | Schmidt | D26/28 |
| D. 290,048 | 5/1987 | Schmidt | D26/28 |
| D. 295,680 | 5/1988 | Whitley, II | D26/28 |
| D. 296,476 | 6/1988 | Kline et al. | D26/28 |
| D. 309,784 | 8/1990 | Whitley, II | D26/28 |
| D. 345,614 | 3/1994 | Whitley, II | D26/28 |
| D. 352,123 | 11/1994 | Huang | D26/28 |
| D. 354,822 | 1/1995 | Bledsoe | D26/28 |
| D. 355,864 | 2/1995 | Lantz | D10/114 |
| D. 367,332 | 2/1996 | Reniger et al. | D26/28 |
| 1,124,391 | 1/1915 | Chase | 340/984 |
| 1,764,622 | 6/1930 | Goodwin | 340/985 |
| 2,938,109 | 5/1960 | Coleman | 362/253 |

(List continued on next page.)

OTHER PUBLICATIONS

"Perko® Navigation Light Selection Chart," 4 pages, 1990.

2 pages of Perko Catalog, Feb. 1995, with photocopy of actual product packaging (2 pgs.), two photographs of actual product, and enlarged photocopies of section of product (2 pgs.).

Aqua Signal® Catalog, 23 pages, 1994.

"Boating Lighting and Accessories," Hellamarine, 18 pages, 1994.

Attwood Catalog, pp. 26–44, 1992–1993.

*Primary Examiner*—Alan Cariaso
*Attorney, Agent, or Firm*—Price, Heneveld, Cooper, DeWitt & Litton

[57] ABSTRACT

An all-round marine navigation light which generally limits the direction of light transmission to a selected angle above and a selected angle below a plane in which light transmission is to be generally directed. The navigation light generally includes a base defining a light limiting perimeter wall, a circumferential lens which allows light transmission in all directions of the selected plane, the lens being secured to the base, a cap defining a downwardly projecting light limiting perimeter wall, the cap being secured to the lens, and the upwardly and downwardly projecting perimeter walls blocking light transmission through lower and upper portions of the circumferential lens, respectively, to generally limit the direction of light transmission to a relatively narrow band generally within and/or adjacent to a selected plane. Also disclosed is an all-round marine navigation light having a light assembly, a connector configured for attachment to a pole, and the light assembly being attached to the connector through an articulated joint, whereby the orientation of the marine navigation light can be adjusted with respect to the connector to facilitate mounting of the light to a variety of sloped surfaces while generally limiting the direction of light transmission to a relatively narrow band generally within and/or adjacent to a selected plane.

16 Claims, 2 Drawing Sheets

U.S. PATENT DOCUMENTS

| | | | |
|---|---|---|---|
| 3,221,162 | 11/1965 | Heenan et al. | 362/61 |
| 3,739,169 | 6/1973 | Weinreich | 362/83.3 |
| 3,763,367 | 10/1973 | Nitsch et al. | 362/83.3 |
| 3,833,800 | 9/1974 | Stewart et al. | 362/477 |
| 3,998,418 | 12/1976 | Boulanger | 362/431 |
| 4,027,150 | 5/1977 | Dean | 362/186 |
| 4,521,836 | 6/1985 | Puttemanns et al. | 362/145 |
| 4,768,139 | 8/1988 | Poppenheimer | 362/431 |
| 4,787,015 | 11/1988 | Ching-Hwei | 362/427 |
| 4,856,452 | 8/1989 | Pingel et al. | 362/61 |
| 4,870,543 | 9/1989 | Born et al. | 362/61 |
| 4,870,551 | 9/1989 | Nagel | 362/263 |
| 4,884,173 | 11/1989 | Cassidy | 362/477 |
| 4,953,062 | 8/1990 | Sikora et al. | 362/263 |
| 5,132,492 | 7/1992 | Wieder | 174/65 R |
| 5,142,457 | 8/1992 | Wehner | 362/477 |
| 5,339,225 | 8/1994 | Wiggerman | 362/61 |
| 5,416,670 | 5/1995 | Authier | 362/34 |
| 5,432,686 | 7/1995 | Meyer | 362/421 |
| 5,704,704 | 1/1998 | Reichard et al. | 362/477 |

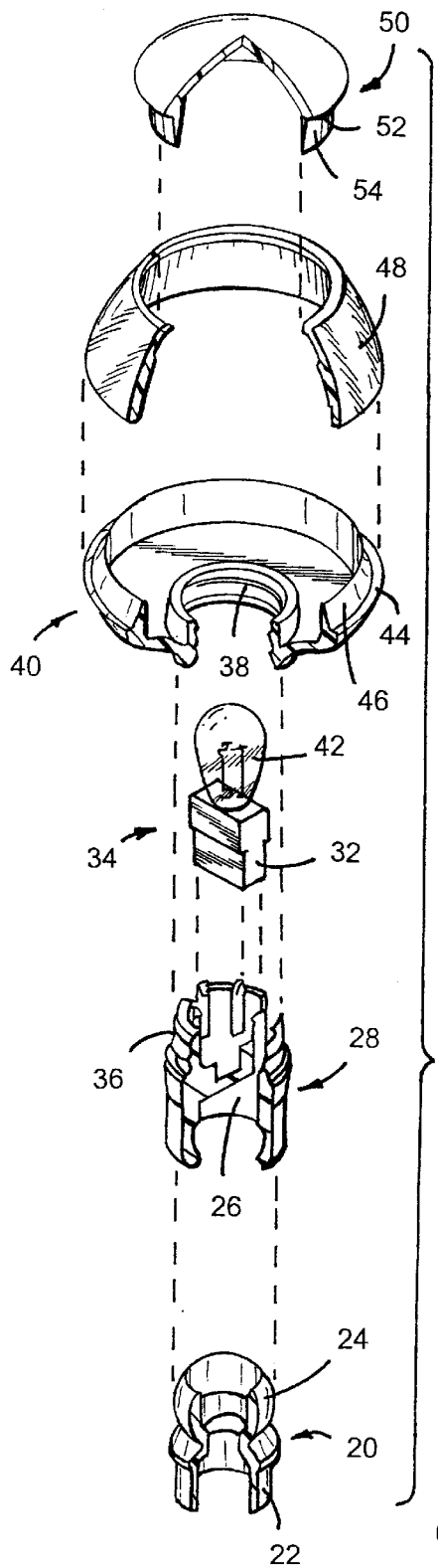
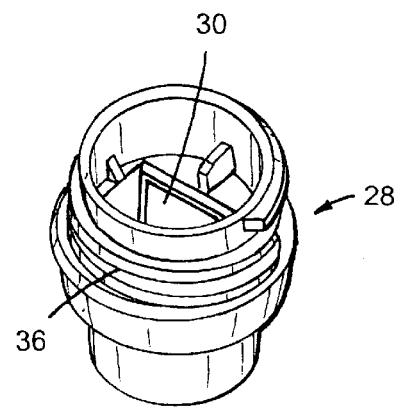
Fig. 3
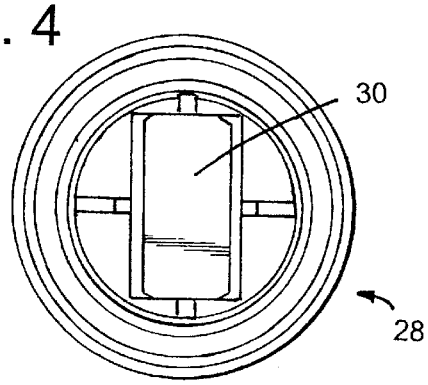
Fig. 4
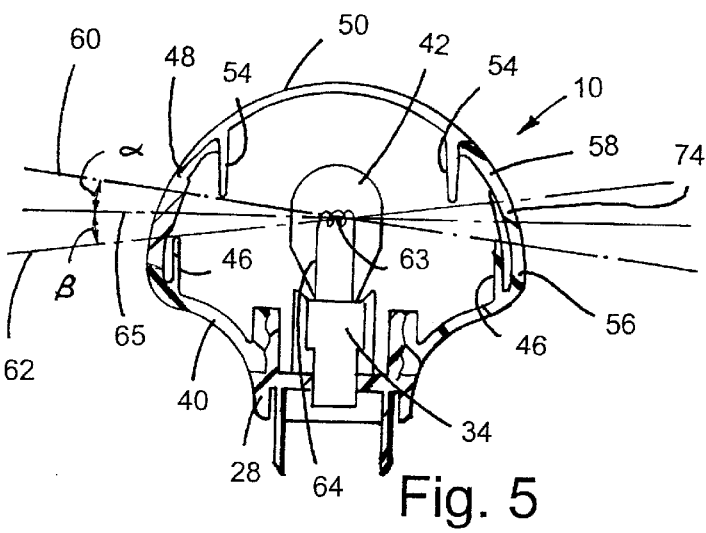
Fig. 5
Fig. 2

ANTI-GLARE ALL-ROUND NAVIGATION LIGHT

FIELD OF THE INVENTION

This invention relates to marine craft navigation lights, and more particularly to an all-round marine navigation light which projects a relatively narrow beam of light with respect to the horizon to reduce or eliminate glare which could interfere with safe operation of the craft.

BACKGROUND OF THE INVENTION

From sunset to sunrise and during other times of reduced visibility, boaters are required to display navigation lights pursuant to U.S. Coast Guard regulations so that the operators of other marine craft can easily determine the position and direction of movement of such craft. In addition to requiring a red port side bow light and a green starboard side bow light, marine craft operators are required to display a white light either at the stern of the marine craft or at another position aft of the bow lights and at a certain elevation. The white light should project an uninterrupted beam of light in all directions in a horizontal plane, i.e. project light radially in all directions substantially perpendicular from a vertical axis to provide a continuous pattern of light which is visible to other boaters in the vicinity regardless of their position relative to the light. Hence, such lights are commonly referred to as "all-round lights" or "360 degree lights."

Although all-round lights, used in combination with the red and green bow lights, have increased boating safety by alerting operators of marine craft of the relative position and movement of other craft after sunset and during other times of reduced visibility, there have been many reported incidents of conventional all-round lights causing glare which can interfere with the ability of a boat operator to see clearly at night. Additionally, there have also been some reported incidents of accidents occurring because of a boat operator experiencing temporary night blindness after looking directly in the direction of the all-round light. Such problems have occurred with conventional all-round lights because the light has not been effectively focused or directionally limited to project light only outwardly in a relatively narrowly defined horizontal direction. To the contrary, conventional all-round lights generally have a relatively large cylindrical or drum-shaped lens which is designed to emit light in substantially all directions, except possibly in a straight upward and/or straight downward direction. Because of the relatively wide band of light emitted from conventional all-round lights, there is a significant possibility that a marine craft operator who glances rearwardly for only a moment can experience temporary night blindness on account of light from the all-round light shining directly into the operator's eyes. Further, glare from conventional all-round lights which emit a relatively wide band of light create relatively large brightly lighted areas on the water near the boat adjacent to areas which are in shadows cast by portions of the boat interposed between the water and the light. Such contrasting light and dark areas can make it difficult to see objects which are in the shadows, especially any such objects which are in the shadows near the brightly lighted areas. Accordingly, there is a perceived need for an all-round light which performs equivalently to conventional all-round lights with respect to adequately warning other boaters of the position and direction of movement of a marine craft to which it is appropriately mounted, while reducing or eliminating problems associated with glare and temporary night blindness. Further, it is desirable to fulfil the forgoing perceived needs with an all-round light which has a relatively traditional appearance which will be accepted by those who build and sell, as well as those who own and operate, marine craft. More specifically, it is desirable to provide an all-round light having a relatively large lens, but which emits light in a directed or limited pattern that reduces or eliminates problems associated with glare, while also providing a continuous pattern of light which is adequately visible to other boaters in the vicinity regardless of their position relative to the light.

Another disadvantage with conventional all-round lights, which generally comprise a lighting fixture connected to one end of a pole, is that they are designed to be properly mounted to a marine craft in only a single orientation, usually with the longitudinal axis of the pole being arranged vertically or at a slight angle with respect to a vertical line. More specifically, conventional all-round lights generally cannot be mounted to a variety of different surfaces which are sloped at an angle which is significantly different from that which the light is designed to be mounted (e.g. horizontal or at least substantially horizontal) while providing a continuous, uniform pattern of light which is equally visible to other boaters irrespective of their position relative to the light. For example, an all-round light having a base with a lower end connected to a pole and an upper end connected to a cylindrical or drum-shaped lens having a top or cap and a cylinder axis which is aligned with the length of the pole, must be mounted to the marine craft so that the pole is in an approximately vertical orientation, as any major deviations from the vertical orientation will cause the base and the top or cap of the light to block light emitted from the lens, creating a pattern of light on the horizon which is not uniform. As a specific example, if a typical all-round light is mounted to a surface which slopes downwardly and rearwardly at a 45 degree angle, then the cylindrical lens will also slope rearward at a 45 degree angle such that visibility of the light will be adequate for other boaters situated on the starboard or port side of the boat on which the all-round light is mounted, but visibility of the light will be relatively poor for any boaters situated on the fore and aft ends of the boat on which the all-round light is mounted, thus reducing safety. A possible solution to this problem is to manufacture a variety of different all-round lens which are adapted to be mounted to surfaces which are sloped at different angles. However, this is not an economically practical solution, as it would significantly increase manufacturing, packaging and inventory costs. Accordingly, there is a need for an all-round light which can be mounted to a variety of differently sloped surfaces, as well as horizontal surfaces, and which is adjustable to project a narrow band of light in all directions along only the horizon to alert other boaters in the vicinity of the position and heading of the boat to which the light is attached without shining light directly into the operators eyes or creating other problems with glare.

SUMMARY OF THE INVENTION

This invention provides an all-round marine navigation light which improves boating safety by reducing problems associated with glare and night blindness by generally limiting the direction of light transmission from the all-round navigation light to a selected plane. Specifically, the all-round light of this invention substantially limits the direction of light transmission to a relatively narrow band between lines which intersect the selected plane at selected angles above and below the plane. By appropriately limiting the transmission of light to a relatively narrow band along a horizontal plane, it is possible to provide a pattern of light which will allow mounting of the all-round light so that light therefrom will not shine directly into the eyes of an operator seated or standing at the helm or controls of a boat to which the all-round light is mounted.

The invention also provides an all-round marine navigation light which can be mounted to a variety of differently sloped surfaces, as well as horizontal surfaces, and which is adjustable to project a narrow band of light in all directions along only a selected horizontal plane to alert other boaters in the vicinity of the position and heading of the boat to which the light is attached without shining light directly into the operators eyes or creating other problems with glare.

In accordance with one aspect of the invention, the all-round marine navigation light includes a base having an upwardly projecting light limiting perimeter wall, a circumferential lens which allows light transmission in all directions of a selected plane, a cap having a downwardly projecting light limiting perimeter wall, and a light bulb and light bulb fixture disposed within the navigation light. The circumferential lens includes a lower edge which is secured to the base, and an upper edge to which the cap is secured. The light bulb is positioned so that it is generally surrounded by the circumferential lens. The upwardly and downwardly projecting perimeter walls block light transmission through lower and upper portions of the circumferential lens respectively, whereby the direction of light transmission from the navigation light is generally limited to a horizontal or other selected plane. By blocking light transmission through upper and lower portions of the lens, it is possible to use a larger lens which has more aesthetic appeal than a small lens, while still limiting the direction of light transmission as desired.

In accordance with another aspect of the invention, an all-round marine navigation light is provided which includes a light assembly, a connector configured for attachment to a pole, and an articulated connector. The light assembly generally includes a base, a circumferential lens having a lower end which is secured to the base, a cap which is secured to an upper end of the circumferential lens, and a light bulb and light bulb fixture disposed within the navigation light. The base is attached to the connector through an articulated joint, whereby the marine navigation light can be rotated with respect to the connector. The articulated connection allows a light assembly designed to project light generally along a horizontal plane to be mounted to a variety of sloped surfaces while permitting adjustability of the orientation of the light assembly so that light is projected along the desired plane.

BRIEF DESCRIPTION OF THE DRAWINGS

FIG. 2 is an exploded perspective view of the all-round marine navigation light of the invention, with portions thereof broken away, and showing the manner in which the marine navigation light is assembled;

FIG. 3 is a perspective view of the socket connector employed in the marine navigation light shown in FIG. 2;

FIG. 4 is a top plan view of the connector shown in FIG. 3;

FIG. 5 is a cross-sectional view of the marine navigation light of the present invention.

DESCRIPTION OF THE PREFERRED EMBODIMENT

Figure 1:
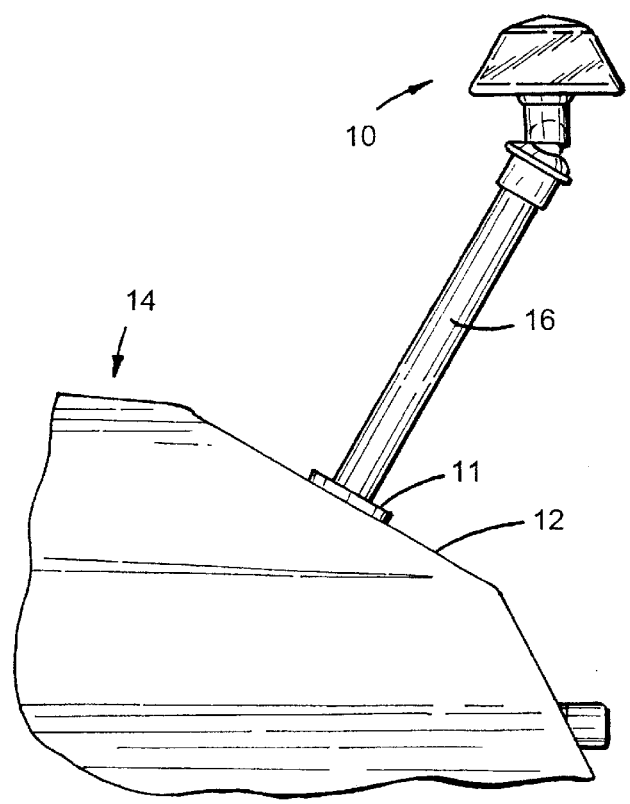
FIG. 1 is a side elevational view of an anti-glare all-round navigation light in accordance with the invention, mounted to an inclined mounting surface of a boat.

There is shown in FIG. 1, a side elevational view of an all-round light 10 in accordance with the invention mounted on a sloped surface 12 of a boat 14. The all-round light 10 is connected to one end of the pole 16 and the other end of the pole is received within a pole-light socket 11 mounted on the sloped surface 12 of the boat.

As shown in FIG. 2, the all-round light 10 includes a ball connector 20 having a first end with a tubular flange skirt 22 configured to frictionally engage the inner side of the cylindrical walls of tubular pole 16, and a second end having a generally ball shaped configuration 24 for being matingly received within a socket 26 on a first end of a socket connector 28. Cooperative engagement between the inner walls of socket 26 and the outer walls of ball 24 allows rotation of connector 28 with respect to connector 20, and, therefore, rotation of all-round light 10 with respect to pole 16, in generally any direction. The illustrated ball and socket arrangement allows rotation of the central axis of all-round light 10 with respect to pole 16 (or connector 20) of up to about 45°, although it is contemplated that alternative ball and socket arrangements which allow greater or lesser articular adjustability can be employed. A second, opposing end of socket connector 28 includes a rectangular recess 30 (FIGS. 3 and 4) which is configured to receive and frictionally engage a generally right parallelpiped-shaped end 32 of a light bulb socket fixture 34. The second or upper end of socket connector 28 also includes an externally threaded portion 36 adapted to threadingly engage internal threads 38 on a first or lower end of an all-round light base 40. The upper end of fixture 34, i.e., the end opposite the right parallelepiped-shaped end 32, includes a standard light bulb socket (not shown) adapted to receive a standard lamp or light bulb 42. Fixture 34 also includes conventional electrical contacts (not shown) for electrically engaging corresponding electrical contacts on light bulb 42, and electrical conductors (not shown) for electrically connecting the all-round light to an electrical power source. It is contemplated that the electrical conductors will be strung through socket connector 28, ball connector 20, pole 16, and pole-light socket 11 in a conventional manner. The lower end of pole 16 can be provided with an electrical plug connector having electrical contacts connected to the electrical conductors and which engage electrical contacts in the pole-light socket 11 when the pole is inserted into the pole-light socket. All-round light base 40 defines a lens supporting perimeter ledge 44 and a light limiting perimeter wall 46 which is spaced radially inwardly and generally adjacent to ledge 44. Wall 46 projects generally upwardly beyond the upper edge of perimeter ledge 44. The lower edges of a circumferential lens 48 is suitably secured to ledge 44, such as by thermal fusion, ultrasonic welding, adhesives, or the like. The illustrated lens 48 has a generally frustoconical shell shape, however, other shapes which allow light transmission in all directions along a selected plane are suitable. For example, a lens shape which comprises a segment of a spherical shell or an ovoid shell (e.g., a spherical or ovoid shell having opposite ends or poles removed), or a cylindrical shell would be suitable for allowing light transmission in all directions of a selected plane. Secured to the upper edges of circumferential lens 48 is a cap 50 defining a lens supported perimeter ledge 52 and a light limiting perimeter wall 54 which projects downwardly beyond the lens supported perimeter ledge. The perimeter wall 54 is disposed radially inwardly of the lens supported perimeter ledge 52. Perimeter ledge 52 of cap 50 is suitably secured to the upper circumferential edge of circumferential lens 48, such as by thermal fusion, ultrasonic welding, adhesives or the like.

As shown in FIG. 5, upwardly projecting light limiting perimeter wall 46 and downwardly projecting light limiting wall 54 block light transmission through lower 56 and upper 58 portions of circumferential lens 48 to generally limit the direction of light transmission from the all-round navigation light 10 to a selected plane (e.g. a horizontal plane). The expression "generally limit the direction of light transmission to a selected plane", as used herein means that the direction of light transmission through lens 48 is substantially limited to a relatively narrow band between conical limits defined by generatrices 60, 62 rotated about a point 63, generally located at the filament 64 of bulb 42, of central axis 65 of all-round marine navigation light 10, with generatrix 60 continuously contacting the lower end of wall 46 during rotation thereof, and with generatrix 62 continuously contacting the upper end of wall 54 during rotation thereof. More concisely stated, the direction of light transmission is substantially limited to a selected angle above and a selected angle below the selected (e.g., horizontal) plane in which light transmission is to be generally directed. By appropriately selecting the position of bulb 42 (and, hence, the filament 64), the length of walls 46 and 54, and the spacing of walls 46 and 54 from lens 48, those having ordinary skill in the art can easily design and fabricate all-round navigation lights in which the direction of light transmission can be substantially limited as desired to directions between a first angle, $\alpha$, above the selected plane, and a second angle, $\beta$, below the selected plane. Angles $\alpha$ and $\beta$ can be the same or different as desired. The angles $\alpha$ and $\beta$ are preferably selected to provide a relatively narrow pattern of projected light to allow appropriate mounting of the all-round light so that light will not shine directly into the eyes of the operator of the boat when seated or standing at the helm or controls of the boat, and so that light from the all-round light will not impinge upon the water in the immediate vicinity of the boat creating contrasting dark and lighted areas near the boat which can make it difficult to see objects in the water, especially objects in dark areas immediately adjacent to lighted areas. Suitable angles which achieve the desired objectives set forth above are about 7.5° for both $\alpha$ and $\beta$, i.e. a diverging beam having a total angle of about 15 and which is centered on the horizon. The expression "substantially limited" as used herein to describe the limits of light transmission is meant to encompass minor deviations from the desired limits which can be caused, for example, by diffusion or diffraction of light at the lens, by the use of a translucent or other light diffusing cap 50 and/or base 40.

Ball connector 20, socket connector 28, base 40, and cap 50 are preferably made of plastic, and more preferably made of thermoplastic materials which can be injection molded. A preferred material for forming parts 20, 28, 40 and 50 is polycarbonate. Connectors 20, 28, base 40 and cap 50 are preferably opaque. However, it is contemplated that connectors 20, 28, base 40 and/or cap 50 can be formed from translucent material which allows transmission of some diffuse light through the cap and/or base. Transmission of adequately diffuse light through the cap and base will not create problems with glare which would interfere with the operators ability to see clearly, and will not induce night blindness, and may have some aesthetic appeal. Lens 48 is preferably made of a clear thermoplastic material. A preferred material for forming lens 48 is clear polycarbonate. Connectors 20, 28, base 40, lens 48 and cap 50 are preferably formed by injection molding.

A suitable method for forming the articulated ball and socket joint is to insert the ball 24 of ball connector 20 into socket 26 of socket connector 28 shortly after connector 28 has been formed from molten plastic. More specifically, if ball 24 is inserted into socket 26 while connector 28 is still relatively warm (i.e. while it is still elastically and resiliently deformable) but after it has acquired its final shape, it will be possible to momentarily deform the socket to allow entry of the ball. Thereafter, the socket will return to its originally formed shape, permanently trapping the ball within the socket. As an alternative, it may also be possible to form the articulated ball and socket joint by inserting ball 24 of a still warm, recently molded connector 20 into a cold socket of connector 28, or to insert a ball of a still warm, recently formed connector 20 into the socket of a still warm, recently formed connector 28. While the ledges 44 and 52 of base 40 and cap 50 are continuous in the illustrated embodiment, it is contemplated that a discontinuous ledge or other support can be provided for connecting lens 48 to base 40, and for connecting cap 50 to lens 48. For example, base 40 can be designed with a perimeter lip into which the lower end of lens 48 can be received.

Figure 6:
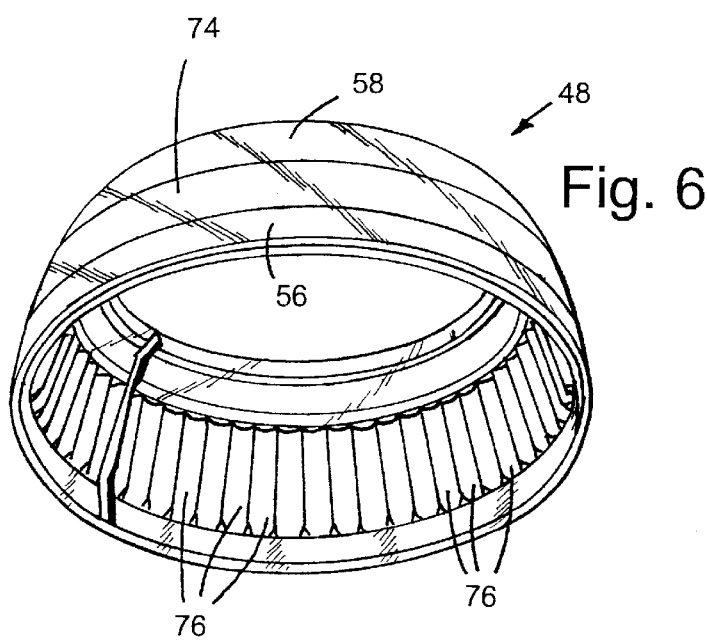
FIG. 6 is a perspective view of the lens incorporated in the marine navigational light shown in the above figures.

As shown in FIG. 6, lens 48 includes a lower portion 56 and an upper portion 58 which can but do not transmit light from light bulb 42 because of downwardly and upwardly projecting walls 46 and 54 (FIGS. 2 and 5) which are interposed between the light bulb and the upper and lower portions of lens 48 respectively. Lens 48 also includes a central, circumferential, light-transmitting portion 74 interposed between portion 56 and 58. Light-transmitting portion 74 of lens 48 is formed with a plurality of optical features or facets 76 which help redirect light along the selected plane to fill in any shadows cast by light from the filament which is interrupted by the filament posts.

Assembly of the all-round light is best understood with reference to FIG. 2. The preferred methods and materials utilized in the manufacture of connectors 20 and 28, base 40, lens 48 and cap 50, and the preferred manner in which the socket joint between ball 24 and socket 26 has been set forth above. Assembly is achieved by inserting light bulb fixture 34 into recess 30 of socket connector 28. Thereafter, base 40 is connected to socket connector 28. With the illustrated embodiment, the base is provided with internal threads which engage external threads of the socket connector to provide a threaded connection between the base and the socket connector. However, other alternative means can be used for connecting the base to the socket connector. Additionally, it is contemplated that the base and the socket connector can be formed as an integral unit. However, releasable connection between the base and the socket connector is preferred to facilitate replacement of the bulb. Lens 48 can be secured to base 40, and cap 50 can be secured to lens 48 at generally any stage of the assembly process. Likewise, light bulb 42 can be connected to fixture 34 at generally any stage of the assembly process. Connector 20 can be attached to a tubular pole at the manufacturing facility where the navigation light is assembled, at the manufacturing facility where a marine craft utilizing the navigation light is assembled, or by the boat owner.

While the articulated joint is describe in terms of a ball connector attached to a pole, and a socket connector attached to a base, an equivalent, alternative approach would be to provide a ball connector which is attached to the base, and a socket connector which is attachable to a pole.

Although it is possible that the navigation light of the present invention can be used without either temporarily or permanently fixing the position of the articulated joint if the frictional resistance between the ball and the socket is sufficient, in general it will be advantageous to at least temporarily and more preferably permanently fix the orientation of the articulated joint. One method of permanently fixing the position of the ball with respect to the socket is to employ fusion techniques which permanently fix the ball to the socket. Examples of permanent fusion techniques which can be employed include ultrasonic fusion, heat staking, and the like. Other examples of methods for permanently or temporarily fixing the orientation of the articulated joint include drilling a hole through the socket and ball and inserting a pin, rivet, screw, bolt or the like. Such methods for permanently or temporarily fixing the orientation of the articulated joint can be performed at the facility where the all-round light is assembled, at the facility of a boat manufacturer, or by a boat owner. In the case of popular articulated joint orientations, it may be practical to fix such orientations at the facility where the all-round light is manufactured without incurring a significant increase in manufacturing, inventory and packaging costs. On the other hand, with articulated joint orientations which are less popular, it may be more desirable for the installer (either a boat manufacturer or a boat owner) to fix the articulated joint orientation, such as with a rivet, screw, bolt, or the like. Additionally, it is contemplated that alternative means can be provided from temporarily fixing the orientation of the articulated joint. Such means, for example, could comprise a clamp which can exert compressive forces on the socket to temporarily increase the frictional engagement between the ball and socket. Such techniques are well known, and the appropriate conditions for connecting the ball and socket can be determined for particular plastic materials without undue effort or experimentation, by those having ordinary skill in the art. Different techniques for forming the ball and socket joint can also be employed if desired.

It will be apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. An all-round marine navigation light comprising:
    a light assembly, including a base, a circumferential lens having a lower end which is secured to the base, a cap which is secured to an upper end of the circumferential lens, and a light bulb and light bulb fixture disposed within a space defined by the light assembly;
    a connector configured for attachment to a pole; and
    the base being attached to the connector through an articulated joint, whereby the orientation of the marine navigation light can be adjusted with respect to the connector, the articulated joint being a ball and socket joint.

2. The navigation light of claim 1, wherein the orientation of the light assembly with respect to the connector is fixed.

3. The navigation light of claim 1, wherein the base defines a lens supporting perimeter ledge and a light limiting perimeter wall which projects upwardly beyond the lens supporting perimeter ledge and which is disposed radially inwardly of the lens supporting perimeter ledge, and wherein the lens includes a lower circumferential edge, the lower circumferential edge of the lens being secured he lens supporting perimeter ledge of the base.

4. The navigation light of claim 3, wherein the cap defines a lens supported perimeter ledge and a light limiting perimeter wall which projects downwardly beyond the lens supported perimeter ledge and which is disposed radially inwardly of the lens supported perimeter ledge, the lens supported perimeter ledge being secured to the upper circumferential edge of the lens.

5. The navigation light of claim 4, wherein the upwardly and downwardly projecting perimeter walls are spaced radially inwardly of the lens and block light transmission through lower and upper portions of the circumferential lens respectively, whereby the direction of light transmission from the navigation light is generally limited to a plane.

6. An all-round marine navigation light, comprising:
    an opaque or translucent base defining a lens supporting perimeter ledge and a light limiting perimeter wall which projects upwardly beyond the lens supporting perimeter ledge and which is disposed radially inwardly of the lens supporting perimeter ledge;
    a circumferential lens which allows light transmission in all directions of a selected plane, the circumferential lens having a lower circumferential edge and an upper circumferential edge, the lower circumferential edge of the lens being secured to the lens supporting perimeter ledge of the base;
    an opaque or translucent cap defining a lens supported perimeter ledge and a light limiting perimeter wall which projects downwardly beyond the lens supported perimeter ledge and which is disposed radially inwardly of the lens supported perimeter ledge, the lens supported perimeter ledge being secured to the upper circumferential edge of the lens;
    a light bulb and light bulb fixture disposed within the navigation light, the light bulb being positioned so that said light bulb is generally surrounded by the circumferential lens;
    the upwardly and downwardly projecting perimeter walls blocking light transmission through lower and upper portions of the circumferential lens respectively, whereby the direction of light transmission from the navigation light is generally limited to the selected plane.

7. The navigation light of claim 6, further comprising a connector configured for attachment to a pole; and the base being attached to the connector through an articulated joint, whereby the orientation of the navigation light can be adjusted with respect to the connector.

8. The marine light of claim 7, wherein the articulated joint is a ball and socket joint.

9. The navigation light of claim 8, wherein the orientation of the marine navigation light with respect to the connector is fixed.

10. An all-round marine navigation light, comprising:
    a base defining a first lens supporting perimeter ledge, and a light limiting perimeter wall spaced radially inwardly from said first ledge, and projecting upwardly,
    a circumferential lens defining upper and lower circumferential edges;
    a cap defining a second lens supporting perimeter ledge, and a light limiting perimeter wall spaced radially inwardly from said second ledge, and projecting downwardly;
    a light bulb and light bulb fixture disposed within the navigation light, such that the light bulb and light bulb fixture are generally surrounded by the circumferential lens;
    the upper edge of said lens being connected with said first ledge, and the lower edge of said lens being connected with said second ledge, such that the upwardly and downwardly projecting perimeter walls block light transmission through the circumferential lens, whereby the direction of light transmission from the navigation light is generally limited to a plane.

11. The navigation light of claim 10, wherein:
the lens has a light emitting exterior surface that is smooth and arcuate in shape.

12. The navigation light of claim 11, wherein:
the lens has a light directing interior surface that is faceted to redirect light along the plane.

13. The navigation light of claim 12, wherein:
the cap has an outer surface that is spherical and matches the arcuate shape of the lens, such that the cap and lens together define a substantially semicircular vertical cross-sectional shape.

14. The navigation light of claim 13, wherein:
the base and the cap are opaque or translucent.

15. The navigation light of claim 14, including:
a pole for mounting the navigation light; and
an articulated joint connecting the navigation light with the pole.

16. The navigation light of claim 15, wherein:
the articulated joint comprises a ball and socket connection.

* * * * *

UNITED STATES PATENT AND TRADEMARK OFFICE
CERTIFICATE OF CORRECTION

PATENT NO. : 5,882,109
DATED : March 16, 1999
INVENTOR(S) : Elzie McKinney and Bruce L. Reniger It is certified that error appears in the above-indentified patent and that said Letters Patent is hereby corrected as shown below:

Column 7, line 61

"he lens" should be --to the lens--.

Signed and Sealed this

Twenty-sixth Day of October, 1999

Attest:

Q. TODD DICKINSON

*Attesting Officer*     *Acting Commissioner of Patents and Trademarks*